(12) United States Patent
Nakao (10) Patent No.: US 10,877,725 B2
(45) Date of Patent: Dec. 29, 2020

(54) IMAGE FORMING APPARATUS

(71) Applicant: KYOCERA Document Solutions Inc., Osaka (JP)

(72) Inventor: Masahiro Nakao, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 16/749,396

(22) Filed: Jan. 22, 2020

(65) Prior Publication Data

US 2020/0241833 A1 Jul. 30, 2020

(30) Foreign Application Priority Data

Jan. 30, 2019 (JP) .................. 2019-014322

(51) Int. Cl.
*G06F 3/16* (2006.01)
*G06K 9/62* (2006.01)
*G06K 9/00* (2006.01)

(52) U.S. Cl.
CPC ......... *G06F 3/165* (2013.01); *G06K 9/00369* (2013.01); *G06K 9/6215* (2013.01)

(58) Field of Classification Search
CPC ... G06F 3/165; G06K 9/00369; G06K 9/6215
See application file for complete search history.

(56) References Cited

U.S. PATENT DOCUMENTS

| 2016/0274657 | A1* | 9/2016 | Zhang | G06F 3/04847 |
| 2018/0262630 | A1* | 9/2018 | Nobutani | H04N 1/00082 |
| 2020/0077043 | A1* | 3/2020 | Kim | H04N 5/60 |
| 2020/0098365 | A1* | 3/2020 | Sato | G10L 15/22 |

FOREIGN PATENT DOCUMENTS

| CN | 105894060 | * | 8/2016 | ......... G06K 17/0022 |
| JP | 2018-107575 A | | 7/2018 | |

* cited by examiner

*Primary Examiner* — Fan S Tsang
*Assistant Examiner* — David Siegel
(74) *Attorney, Agent, or Firm* — Stein IP, LLC (57) ABSTRACT

An image forming apparatus includes a loudspeaker for producing sounds, a controller for performing sound-volume setting for the loudspeaker, and a human-body detection unit for detecting a presence or absence of a human body. The human-body detection unit outputs a value corresponding to a distance between the image forming apparatus and a human body. Upon detecting a human body on a basis of an output value by the human-body detection unit, the controller recognizes, as a first object distance, a distance corresponding to the output value of the human-body detection unit, and performs sound-volume setting for the loudspeaker on a basis of the first object distance.

9 Claims, 7 Drawing Sheets

| FIRST OBJECT DISTANCE (FIRST REFERENCE DISTANCE) | FIRST DISTANCE-BASE VOLUME |
|---|---|
| D11 | VOLUME 2 |
| D12 | VOLUME 3 |
| D13 | VOLUME 4 |

IMAGE FORMING APPARATUS

INCORPORATION BY REFERENCE

This application is based upon and claims the benefit of priority from the corresponding Japanese Patent Application No. 2019-014322 filed on Jan. 30, 2019, the entire contents of which are incorporated herein by reference.

BACKGROUND

The present disclosure relates to an image forming apparatus equipped with a loudspeaker.

RELATED ART

In conventional image forming apparatuses, a loudspeaker is installed. The loudspeaker produces informative sounds for giving information to a user of the image forming apparatus as well as operating sounds of an operation panel and other sounds.

SUMMARY

An image forming apparatus of the present disclosure includes a loudspeaker, a controller, and a human-body detection unit. The loudspeaker produces sounds. The controller performs sound-volume setting for the loudspeaker. The human-body detection unit detects a presence or absence of a human body. The human-body detection unit outputs a value corresponding to a distance between the image forming apparatus and a human body. Upon detecting a human body on a basis of an output value by the human-body detection unit, the controller recognizes, as a first object distance, a distance corresponding to the output value of the human-body detection unit, and performs sound-volume setting for the loudspeaker on a basis of the first object distance.

DETAILED DESCRIPTION

<Configuration of Image Forming Apparatus>

Figure 1:
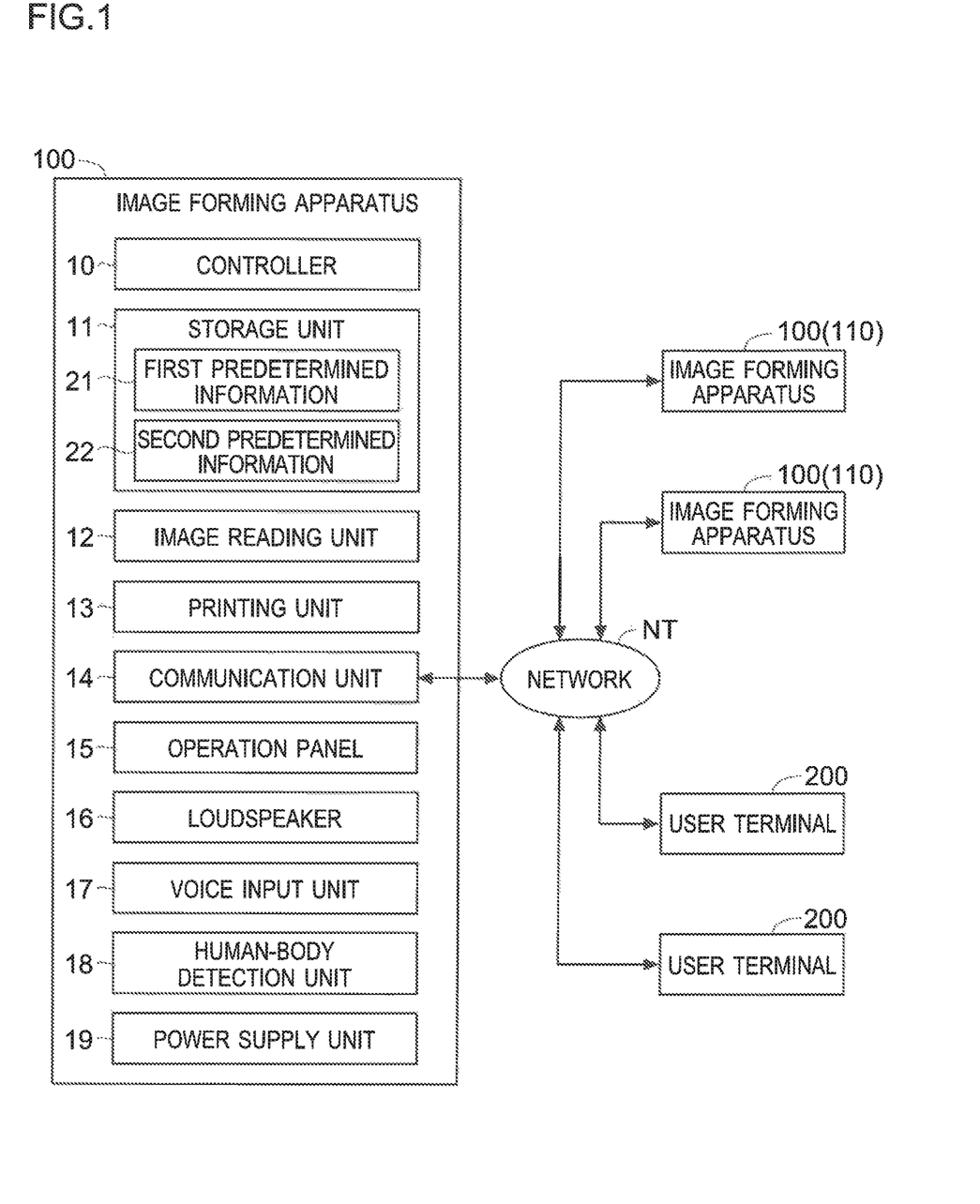
FIG. 1 is a block diagram showing a configuration of an image forming apparatus according to one embodiment of the disclosure.

As shown in FIG. 1, an image forming apparatus 100 of this embodiment includes a controller 10. The image forming apparatus 100 also includes a storage unit 11. The controller 10 includes a CPU. The controller 10 controls the image forming apparatus 100 on a basis of control programs and control data. The storage unit 11 includes nonvolatile memory (ROM) and volatile memory (RAM). The storage unit 11 is connected to the controller 10. The controller 10 reads and writes information from and into the storage unit 11. The control programs and the control data are stored in the storage unit 11.

Also, the image forming apparatus 100 includes an image reading unit 12 and a printing unit 13. The image reading unit 12 and the printing unit 13 are connected to the controller 10. The controller 10 controls reading operation of the image reading unit 12 as well as printing operation of the printing unit 13.

The image reading unit 12 reads an original document to generate image data of the document. The image reading unit 12 includes a light source and an image sensor. The light source irradiates the document with light. The image sensor receives reflected light reflected by the document to subject the light to photoelectric conversion.

The printing unit 13 feeds one of paper sheets contained in a sheet cassette onto a sheet conveyance path, and conveys the sheet along the sheet conveyance path. The printing unit 13 also forms an image based on image data (e.g., image data of a document derived from reading by the image reading unit 12). Then, the printing unit 13 prints the image on the sheet that is under conveyance.

The printing unit 13 includes a photosensitive drum, a charging device, an exposure device, a developing device, and a transfer roller. The printing unit 13 further includes a fixing device. The photosensitive drum carries thereon a toner image. The charging device electrically charges a circumferential surface of the photosensitive drum. The exposure device forms an electrostatic latent image on the circumferential surface of the photosensitive drum. The developing device develops the electrostatic latent image formed on the circumferential surface of the photosensitive drum into a toner image. The transfer roller is set into pressure contact with the photosensitive drum so as to make a transfer nip against the photosensitive drum.

The sheet under conveyance enters the transfer nip. While the conveyed sheet is passing through the transfer nip, the toner image on the circumferential surface of the photosensitive drum is transferred onto the sheet. The sheet with the toner image transferred thereon is directed toward the fixing device. The fixing device fixes the toner image on the sheet.

The image forming apparatus 100 also includes a communication unit 14. The communication unit 14, which is an interface for connecting the image forming apparatus 100 to a LAN or other network NT, includes a communication circuit, communication memory, a communication connector, and the like.

The communication unit 14 is connected to the controller 10. The controller 10 controls the communication unit 14. The controller 10, by means of the communication unit 14, communicates with user terminals 200 (personal computers) connected to the network NT. Connecting a user terminal 200 to the network NT allows an image forming apparatus 100 to be used as a printer.

Other image forming apparatuses 100 are connected to the network NT. The controller 10 communicates with other image forming apparatuses 100 by means of the communication unit 14. Hereinbelow, in some cases, image forming apparatuses 100 may be referred to with reference numeral 110 added thereto.

The image forming apparatus 100 further includes an operation panel 15. The operation panel 15 accepts operations from a user. In the operation panel 15, a touch screen is provided. Displayed on the touch screen is a screen view in which software buttons are arranged. Hardware buttons are also provided in the operation panel 15.

The operation panel 15 is connected to the controller 10. The controller 10 controls display operations of the operation panel 15. Also, the controller 10 detects operations executed on the operation panel 15. That is, the controller 10 detects operations on the touch screen (software buttons) as well as operations on the hardware buttons.

The image forming apparatus 100 further includes a loudspeaker 16. The loudspeaker 16 is installed in the operation panel 15. The loudspeaker 16 produces informative sounds and operating sounds. Individual kinds of sound data for the informative sounds and the operating sounds are stored in the storage unit 11. Beeps, melodies, electronic voices, and the like can be outputted from the loudspeaker 16. Electronic voice (speech guidance etc.) may also be outputted as an informative sound.

The informative sound is a sound for giving information to a user of the image forming apparatus 100. Upon occurrence of any abnormality (jam error or paper out error) to the image forming apparatus 100, an informative sound (alarm sound) is issued from the loudspeaker 16. As a result of this, the user can be informed of the occurrence of an abnormality on the image forming apparatus 100.

An operating sound is issued from the loudspeaker 16 when the touch screen (software buttons) in the operation panel 15 is operated. An operating sound may be issued from the loudspeaker 16 also when hardware buttons in the operation panel 15 are operated. The loudspeaker 16 issues the operating sound once each time a user presses the touch screen (software buttons) in the operation panel 15.

The loudspeaker 16 is connected to the controller 10. The controller 10 controls the loudspeaker 16. The controller 10, having detected occurrence of any abnormality to the image forming apparatus 100, instructs the loudspeaker 16 to issue an informative sound (alarm sound) relevant to the occurrent abnormality. Also, when having detected an operation on the touch screen (software buttons) in the operation panel 15, the controller 10 makes an operating sound outputted from the loudspeaker 16.

The controller 10 further performs a process of setting sound volumes of the loudspeaker 16 (respective volumes of informative sound and operating sound to be issued from the loudspeaker 16). Sound volumes of the loudspeaker 16 are each set to any one of predetermined sound volumes in plural steps. Although not particularly limited, a sound volume of the loudspeaker 16 is changeable in five steps of minimum sound volume 1, sound volume 2 larger than sound volume 1, sound volume 3 larger than sound volume 2, sound volume 4 larger than sound volume 3, and maximum sound volume 5. The operating sound is on/off switchable, where setting off the operating sound makes it possible to prevent the operating sound from being outputted from the loudspeaker 16 even when the touch screen (software buttons) in the operation panel 15 is operated.

Changeover of the sound volume of the loudspeaker 16 can be made at the discretion of the user. The operation panel 15 accepts a changeover of the sound volume of the loudspeaker 16 from the user, Acceptance of the changeover of the sound volume is processed for each of the informative sound and the operating sound. As changeover operations for changing over the sound volume of the loudspeaker 16, the operation panel 15 accepts an operation of designating either one of informative sound and operating sound, as well as an operation of designating a sound volume. The controller 10 changes over the volume of either one of the informative sound and the operating sound, whichever is designated by the user, to a sound volume of user's designation.

In this connection, an automatic setting function of automatically setting (changing) a sound volume of the loudspeaker 16 is installed on the image forming apparatus 100. A process related to the automatic setting function (hereinafter, referred to as volume setting process) is fulfilled by the controller 10. The controller 10 automatically sets a sound volume of the loudspeaker 16 in response to a state of a vicinity of the image forming apparatus 100. This will be detailed later.

The image forming apparatus 100 is also equipped with a voice input unit 17. The voice input unit 17 includes a microphone and a voice processing circuit. The microphone collects voices of speakers. The voice processing circuit converts input voices inputted to the microphone into voice data (electric signals).

For example, the voice input unit 17 is installed in the operation panel 15. With the voice input unit 17 installed in the operation panel 15, voices uttered by a user operating the operation panel 15 are inputted to the voice input unit 17.

The voice input unit 17 is connected to the controller 10. The voice input unit 17 outputs, to the controller 10, input voice data corresponding to input voices. The controller 10 executes a voice recognition process relative to input voice data. Programs for fulfilling the voice recognition process are stored in the storage unit 11.

The image forming apparatus 100 is further equipped with a human-body detection unit 18. The human-body detection unit 18 is provided in the image forming apparatus 100 to detect a presence or absence of any human body in a vicinity of the image forming apparatus 100 or a distance between a human body present in a vicinity of the image forming apparatus 100 and the image forming apparatus 100.

The human-body detection unit 18 includes a human-motion sensor. For example, a pyroelectric type infrared sensor may be used as the human-motion sensor. Infrared rays radiated from a human body are let to be incident on the human-motion sensor. The human-body detection unit 18 makes its output varied in response to incident quantities of infrared rays that have been incident on the human-motion sensor. The output value of the human-body detection unit 18 becomes larger and larger with increasing incident quantity of infrared rays on the human-motion sensor, and becomes smaller and smaller with decreasing incident quantity of such infrared rays.

For example, assume that a user (human body) has come to nearby the image forming apparatus 100 such that the user has entered a detection range of the human-body detection unit 18. In this case, since the incident quantity of infrared rays emitted from the human body that have been incident on the human-motion sensor increases, the output value of the human-body detection unit 18 becomes larger. In other words, the human-body detection unit 18 outputs a value indicative that a human body is present in a vicinity of the image forming apparatus 100. Since the incident quantity of infrared rays on the human-motion sensor increases more and more with decreasing distance of a human body to the image forming apparatus 100, the output value of the human-body detection unit 18 becomes larger.

Also assume that the user has gone away from the image forming apparatus 100, In this case, since the incident quantity of infrared rays emitted from the human body decreases, the output value of the human-body detection unit 18 becomes smaller. In other words, the human-body detection unit 18 outputs a value indicative that no human body is present in a vicinity of the image forming apparatus 100.

Figure 2:
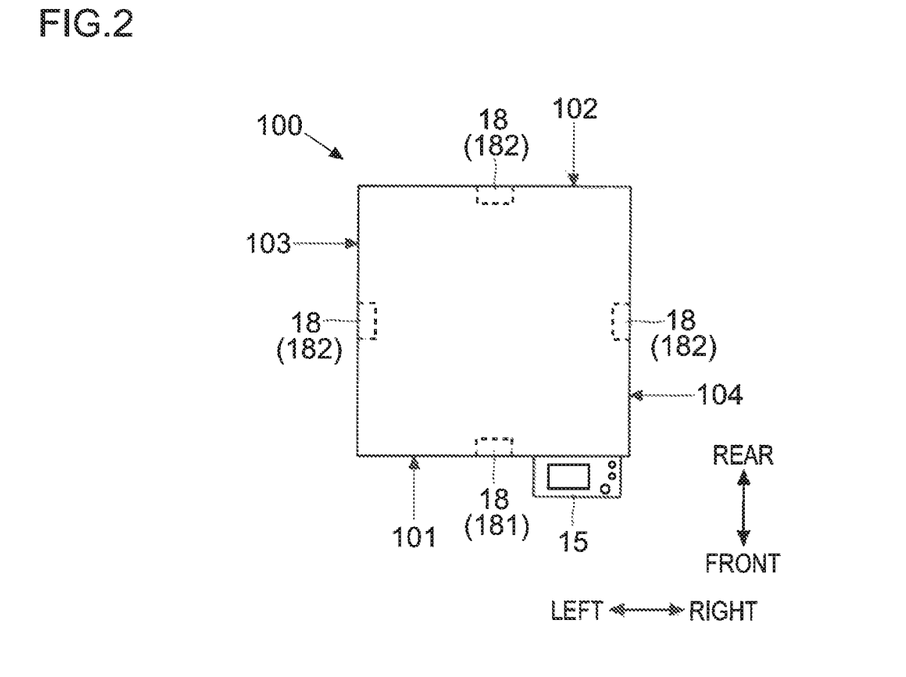
FIG. 2 is a view showing installation sites of human-body detection units to be installed in the image forming apparatus according to one embodiment of the disclosure.

The human-body detection unit 18 is provided in plurality in the image forming apparatus 100, Individual installation sites of the plural human-body detection units 18 are different from one another. Given below with reference to FIG. 2 is a description of the installation sites for the plural human-body detection units 18.

The image forming apparatus 100 has a front face 101 (a portion of the image forming apparatus 100 including its front face), a rear face 102 (a portion of the image forming apparatus 100 including its rear face), a left face 103 (a portion of the image forming apparatus 100 including its left face) and a right face 104 (a portion of the image forming apparatus 100 including its right face). For use of the image forming apparatus 100, normally, the user faces the front face 101, The human-body detection units 18 are installed each one in number for the front face 101, the rear face 102, the left face 103 and the right face 104, respectively. That is, the number of installed human-body detection units 18 is four.

When a user (human body) has come from front of the image forming apparatus 100 to nearby the image forming apparatus 100, the human body is detected by the human-body detection unit 18 located on the front face 101. When the user has come from rear of the image forming apparatus 100 to nearby the image forming apparatus 100, the human body is detected by the human-body detection unit 18 located on the rear face 102. When the user has come from left of the image forming apparatus 100 to nearby the image forming apparatus 100, the human body is detected by the human-body detection unit 18 located on the left face 103. When the user has come from right of the image forming apparatus 100 to nearby the image forming apparatus 100, the human body is detected by the human-body detection unit 18 located on the right face 104.

The loudspeaker 16 is installed in the operation panel 15. The operation panel 15 is installed on the front face 101. That is, the loudspeaker 16 is installed on the front face 101. With this configuration, the front face 101 is equivalent to 'specified face.' The human-body detection unit 18 located on the front face 101 is equivalent to 'first detection unit.' The human-body detection units 18 located on the rear face 102, the left face 103 and the right face 104 are each equivalent to 'second detection unit.' Hereinafter, the human-body detection unit 18 on the front face 101 may be referred to also as first detection unit 181, and the human-body detection units 18 on the rear face 102, the left face 103 and the right face 104 may also be referred to each as second detection unit 182.

Reverting to FIG. 1, the plural human-body detection units 18 are connected to the controller 10. Based on respective output values of the plural human-body detection units 18, the controller 10 detects a presence or absence of a human body in a vicinity of the image forming apparatus 100. When the user has entered a detection range of any one of the plural human-body detection units 18, a value indicative of the presence of a human body is outputted from a human-body detection unit 18 into the detection range of which the user has entered. Then, the controller 10 detects a human body on a basis of the output value of the human-body detection unit 18 into the detection range of which the user has entered (detects that a human body is present in a vicinity of the image forming apparatus 100). Moreover, the controller 10 recognizes which human-body detection unit 18 (hereinafter, the pertinent human-body detection unit 18 will be referred to as object detection unit 18) out of the plural human-body detection units 18 has outputted the value indicative of the presence of a human body.

Further, when having detected the presence of a human body in a vicinity of the image forming apparatus 100, the controller 10 recognizes, as a first object distance, a first reference distance corresponding to the output value of the object detection unit 18 out of predetermined plural first reference distances. It is noted that ranges of the individual output values corresponding to the plural first reference distances, respectively, are previously determined and stored in the storage unit 11 as first reference distance information. In the first reference distance information, ranges of the individual output values corresponding to the plural first reference distances, respectively, are so defined that the shorter the first reference distance is, the larger the output value corresponding thereto becomes. Accordingly, the larger the output value of the object detection unit 18 is (the closer in distance the human body is to the image forming apparatus 100), the shorter the first object distance recognized by the controller 10 becomes.

The image forming apparatus 100 also includes a power supply unit 19. The power supply unit 19 includes a voltage generation circuit for generating voltages, and the like. The power supply unit 19 generates voltages for operating the individual units (controller 10, storage unit 11, image reading unit 12, printing unit 13, communication unit 14, operation panel 15, loudspeaker 16, voice input unit 17, and human-body detection unit 18) of the image forming apparatus 100, and supplies electric power to those individual units.

The power supply unit 19 is connected to the controller 10. The controller 10 controls the power supply unit 19. The controller 10 switches on/off power supply from the power supply unit 19 to the human-body detection units 18. Switching-on/off of power supply from the power supply unit 19 is enabled for each of the plural human-body detection units 18, independently of one another. That is, there is a possibility that electric power is supplied to only one human-body detection unit 18 (no electric power is supplied to the other human-body detection units 18).

<Power Supply to Human-Body Detection Units>

The image forming apparatus 100 is installed in a room. Various objects such as walls and poles, bookshelves and the like are present in a room. Ordinarily, an installation site for the image forming apparatus 100 is determined by the user such that any one or more apparatus faces other than the front face, out of the plural side faces (apparatus faces) of the image forming apparatus 100, extend along an object (e.g., wall surface).

Figure 3:
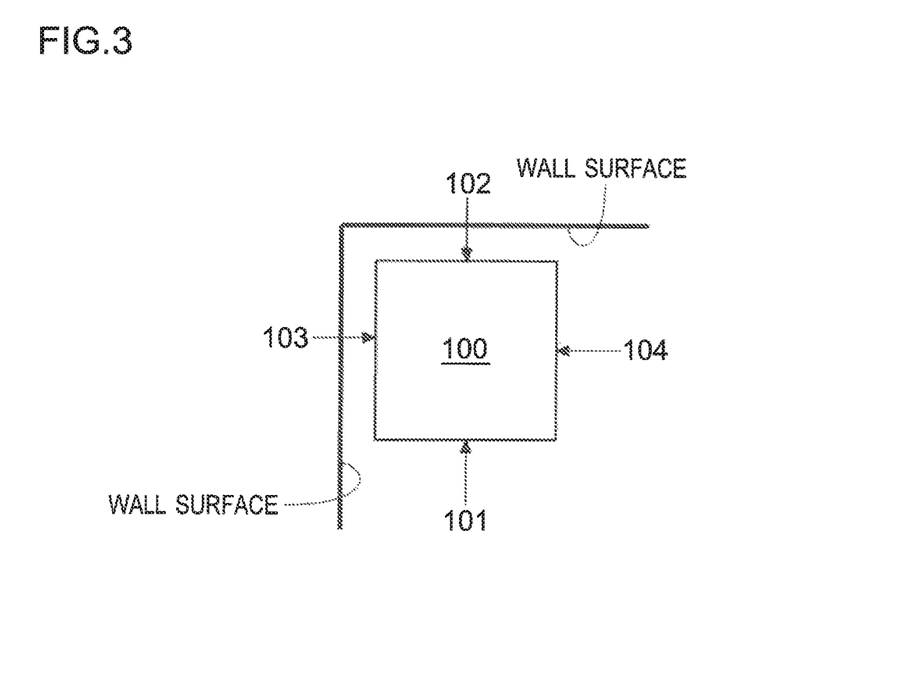
FIG. 3 is a view showing an example of an installation site of the image forming apparatus according to one embodiment of the disclosure.
Figure 4:
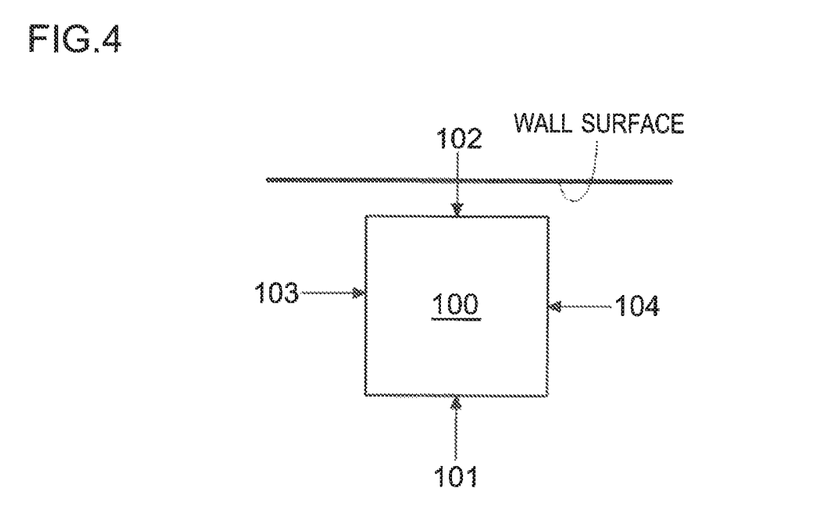
FIG. 4 is a view showing an example of the installation site of the image forming apparatus according to one embodiment of the disclosure.

Examples of layout of a room in which the image forming apparatus 100 is installed are shown in FIGS. 3 and 4. In the case of FIG. 3, the image forming apparatus 100 is so installed that the rear face 102 and the left face 103 extend along wall surfaces, respectively. In the case of FIG. 4, the image forming apparatus 100 is so installed that the rear face 102 extends along a wall surface.

In the case of FIG. 3, the user cannot enter between the rear face 102 and the wall surface. Also, the user cannot enter between the left face 103 and the wall surface. Accordingly, the user neither approaches the image forming apparatus 100 from the rear of the image forming apparatus 100, nor approaches the image forming apparatus 100 from the left of the image forming apparatus 100. For this reason, there is no need for executing human-body detection by the human-body detection units 18 located on the rear face 102 and the left face 103 (the human-body detection units 18 on the rear face 102 and the left face 103 never output any value indicative of presence of a human body). Accordingly, the human-body detection units 18 on the rear face 102 and the left face 103 are unnecessary.

In the case of FIG. 4, since the user cannot enter between the rear face 102 and the wall surface, the user never approaches the image forming apparatus 100 from the rear of the image forming apparatus 100. For this reason, there is no need for executing human-body detection by the human-body detection unit 18 located on the rear face 102 (the human-body detection unit 18 on the rear face 102 never outputs any value indicative of presence of a human body). Accordingly, the human-body detection unit 18 on the rear face 102 is unnecessary.

As in the examples shown in FIGS. 3 and 4, one or another of the human-body detection units 18 may be unnecessary depending on the installation site of the image forming apparatus 100. Supplying electric power to unnecessary human-body detection units 18 would result in useless consumption of electric power.

Therefore, the controller 10 determines unnecessary human-body detection units 18. It is recognized which apparatus faces out of the front face 101, the rear face 102, the left face 103 and the right face 104 extend along an object (wall surface etc.) present in the room. Then, human-body detection units 18 installed on the relevant apparatus faces are decided to be unnecessary. In other words, human-body detection units 18 installed each on an apparatus face shorter in distance to the in-room object than a specified threshold value are decided to be unnecessary. Then, the controller 10 prevents those unnecessary human-body detection units 18 from being supplied with electric power by the power supply unit 19.

In order to allow the controller 10 to recognize unnecessary human-body detection units 18, input of layout information related to in-room layout is accepted by the operation panel 15. The operation panel 15 accepts, from the user, input of information, as the layout information, indicating which ones of the front face 101, the rear face 102, the left face 103 and the right face 104 extend along the in-room object. Otherwise, the operation panel 15 accepts, from the user, input of information, as the layout information, indicating distances between the in-room object and each of the front face 101, the rear face 102, the left face 103 and the right face 104.

In a case where the operation panel 15 has accepted input of information indicative of apparatus faces extending along an in-room object, the controller 10 interrupts power supply to human-body detection units 18 installed on the apparatus faces indicated by the input information. In a case where the operation panel 15 has accepted input of information indicative of distances to an in-room object, the controller 10 recognizes apparatus faces shorter in distance to the in-room object than the specified threshold value, and interrupts power supply to the human-body detection units 18 installed on the apparatus faces.

In the case of FIG. 3, power supply to the human-body detection units 18 located on the rear face 102 and the left face 103 is interrupted. In the case of FIG. 4, power supply to the human-body detection unit 18 located on the rear face 102 is interrupted.

It is also allowable that distance measuring sensors (ultrasonic sensors etc.) are installed on the front face 101, the rear face 102, the left face 103 and the right face 104, respectively, and connected to the controller 10, in this case, based on respective output values of the plural distance measuring sensors, the controller 10 recognizes apparatus faces out of the front face 101, the rear face 102, the left face 103 and the right face 104 that are shorter in distance to an in-room object than the specified threshold value.

<Volume Setting for Informative Sound>

The controller 10 executes a sound-volume setting process for the informative sound on a basis of the first object distance. For execution of the sound-volume setting process for the informative sound, the controller 10 looks up to first predetermined information 21. The first predetermined information 21 is previously stored in the storage unit 11 (see FIG. 1).

The first predetermined information 21 is information indicative of individual sound volumes (hereinafter, referred to as first distance-base volume) correspondingly associated with plural first reference distances, respectively, that can be first object distances. With regard to the first predetermined information 21, individual sound volumes corresponding to the plural first reference distances, respectively, are defined such that as the first reference distance becomes shorter and shorter, the first distance-base volume corresponding thereto becomes smaller and smaller. For example, such first predetermined information 21 as shown in FIG. 5 is stored in the storage unit 11.

Figure 5:
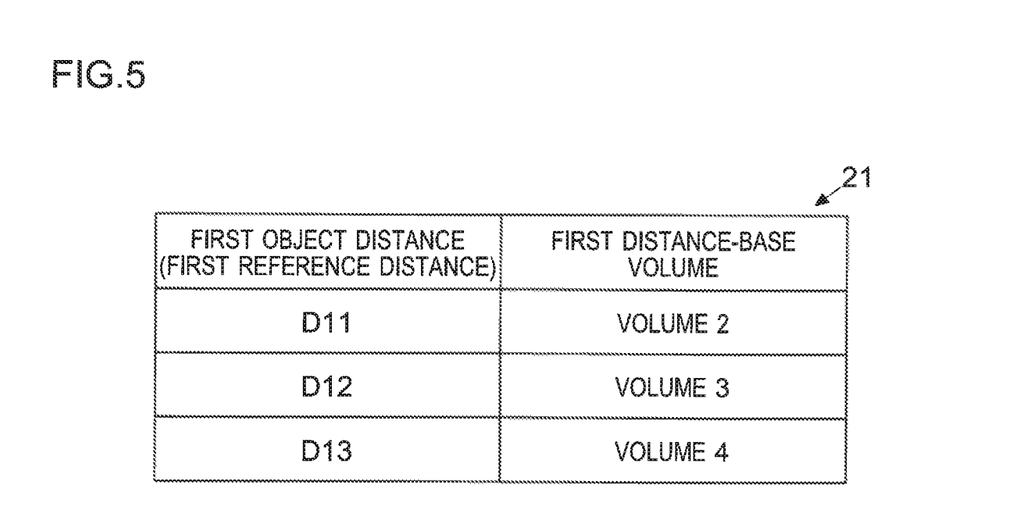
FIG. 5 is a view for explaining first predetermined information to be stored in a storage unit of the image forming apparatus according to one embodiment of the disclosure.

In the first predetermined information 21 shown in FIG. 5, D11, D12 and D13 are defined as the first reference distances (D11<D12<D13). Then, 'VOLUME 2' as a first distance-base volume is set into correspondence to the shortest first reference distance D11. 'VOLUME 3' as a first distance-base volume is set into correspondence to an intermediate first reference distance D12. 'VOLUME 4' as a first distance-base volume is set into correspondence to the longest first reference distance D13.

Figure 6:
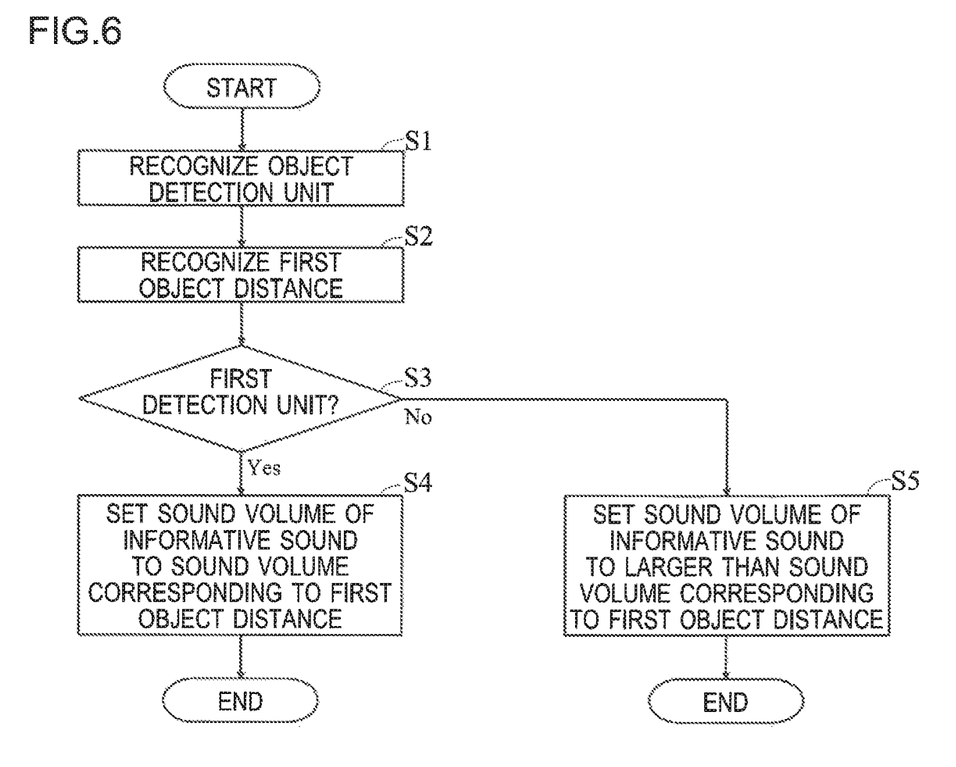
FIG. 6 is a flowchart showing a flow of a volume setting process for informative sound to be performed by a controller of the image forming apparatus according to one embodiment of the disclosure.

Hereinbelow, a volume setting process for the informative sound to be executed by the controller 10 will be described concretely with reference to a flowchart shown in FIG. 6. The flowchart of FIG. 6 gets started when a user has entered a detection range of any one of the human-body detection units 18 (a human-body detection unit 18 to which electric power is supplied). That is, when the controller 10 has detected a human body, the flowchart of FIG. 6 gets started.

At step S1, the controller 10 recognizes, as an object detection unit 18, a human-body detection unit 18 that has outputted a value indicative of a presence of a human body. At step S2, the controller 10 recognizes a first object distance.

At step S3, the controller 10 decides whether or not the object detection unit 18 is the first detection unit 181 (whether or not the human-body detection unit 18 on the front face 101 has detected a human body). As a result, when the controller 10 decides that the object detection unit 18 is the first detection unit 181 (the human-body detection units 18 on the front face 101 has detected a human body), the processing flow moves on to step S4. On the other hand, when the controller 10 decides that the object detection unit 18 is not the first detection unit 181 but a second detection unit 182 (any one of the human-body detection units 18 on the rear face 102, the left face 103 and the right face 104 has detected a human body), the processing flow moves on to step S5.

Upon transition to step S4, based on the first predetermined information 21, the controller 10 recognizes a first distance-base volume corresponding to the first object distance. Then, the controller 10 sets sound volume of the informative sound to the first distance-base volume corresponding to the first object distance.

Upon transition to step S5, based on the first predetermined information 21, the controller 10 recognizes a first distance-base volume corresponding to the first object distance. Then, the controller 10 sets sound volume of the informative sound to a volume larger than the distance-base volume corresponding to the first object distance.

For example, assume that the object detection unit 18 is the first detection unit 181, and the first object distance is D12. In this case, the volume of the informative sound becomes 'VOLUME 3,' With the first object distance being D11, the volume of the informative sound becomes 'VOLUME 2'; and with the first object distance being D13, the volume of the informative sound becomes 'VOLUME 4.' That is, the shorter the first object distance is, the smaller the volume of the informative sound becomes.

Meanwhile, assume that whereas the first object distance is D12, the object detection unit 18 is a second detection unit 182. In this case, the volume of the informative sound becomes larger than 'VOLUME 3.' For example, the volume of the informative sound may be one-step larger than the volume corresponding to the first object distance. With the first object distance being D12, the volume corresponding to the first object distance is 'VOLUME 3,' so that the volume of the informative sound becomes 'VOLUME 4.'

In this connection, as shown in FIG. 5, there is no first object distance (first reference distance) corresponding to 'VOLUME 1' that is the minimum sound volume. Therefore, the controller 10 does not lower the volume of the informative sound to 'VOLUME 1.' Besides, the operating sound can be set to off mode, but the informative sound is never set to off mode. That is, upon occurrence of any abnormality to the image forming apparatus 100, an informative sound is necessarily outputted.

Likewise, there is no first object distance (first reference distance) corresponding to 'VOLUME 5' that is the maximum volume. This is because the initial value is set to 'VOLUME 5.' While no human body is present in a vicinity of the image forming apparatus 100, the controller 10 maintains the volume of the informative sound at the initial value. Also, after detection of the presence of a human body by any one of the human-body detection units 18, upon deciding that there has come to an absence of a human body in all the detection ranges of the plural human-body detection units 18, the controller 10 returns the volume of the informative sound to the initial value.

<Volume Setting for Operating Sound>
(Volume Setting Based on Seat Location in a Room)

Standard sound-volume information indicative of standard sound volumes of the operating sound is stored in the storage unit 11. When main power is thrown into the image forming apparatus 100, the controller 10 sets the volume of the operating sound to a standard sound volume indicated by the standard sound-volume information. At the time of shipping or delivery of the image forming apparatus 100, any one of VOLUMES 1 to 5 is set as the standard sound volume.

In this aspect, the controller 10 executes an update process of updating the standard sound-volume information. When the operation panel 15 has accepted input of a second object distance from the user, the controller 10 decides that an execution timing of the update process has come up. The second object distance corresponds to a distance between the image forming apparatus 100 and the seat closest to the image forming apparatus 100 in a room in which the image forming apparatus 100 is installed. For example, when interior of the room in which the image forming apparatus 100 is installed is changed in layout, the user inputs the second object distance to the operation panel 15.

Upon acceptance of the input of the second object distance from the user, the operation panel 15 displays a screen (not shown) in which plural selection buttons corresponding to predetermined plural second reference distances, respectively, are disposed. The controller 10 recognizes, as the second object distance, a second reference distance corresponding to an operated selection button out of the plural selection buttons.

The operation panel 15 also accepts input of layout information from the user. Based on the layout information inputted to the operation panel 15, the controller 10 recognizes one or more apparatus faces extending along an object (wall surface etc.) present in the room in which the image forming apparatus 100 is installed.

The controller 10 makes apparatus information stored in the storage unit 11, the apparatus information containing a second object distance corresponding to the image forming apparatus 100 (user's own apparatus). The apparatus information also contains information indicative of apparatus faces extending along an object present in the room in which the image forming apparatus 100 is installed. The controller 10 executes the update process on a basis of the apparatus information stored in the storage unit 11.

In a case where a GPS system is installed on the image forming apparatus 100, the controller 10 recognizes, by using the GPS system, a position of the image forming apparatus 100 in the room in which the image forming apparatus 100 is installed. Then, based on the recognized position, the controller 10 recognizes a second object distance.

In this connection, the update process by the controller 10 is executed based on second predetermined information 22. The second predetermined information 22 is previously stored in the storage unit 11 (see FIG. 1).

The second predetermined information 22 is information indicative of individual sound volumes (hereinafter, referred to as second distance-base volume) correspondingly associated with plural second reference distances, respectively, that can be second object distances. In the second predetermined information 22, individual sound volumes corresponding to the plural second reference distances, respectively, are defined such that the shorter the second reference distance is, the smaller the second distance-base volume corresponding thereto becomes. For example, such second predetermined information 22 as shown in FIG. 7 is stored in the storage unit 11.

Figure 7:
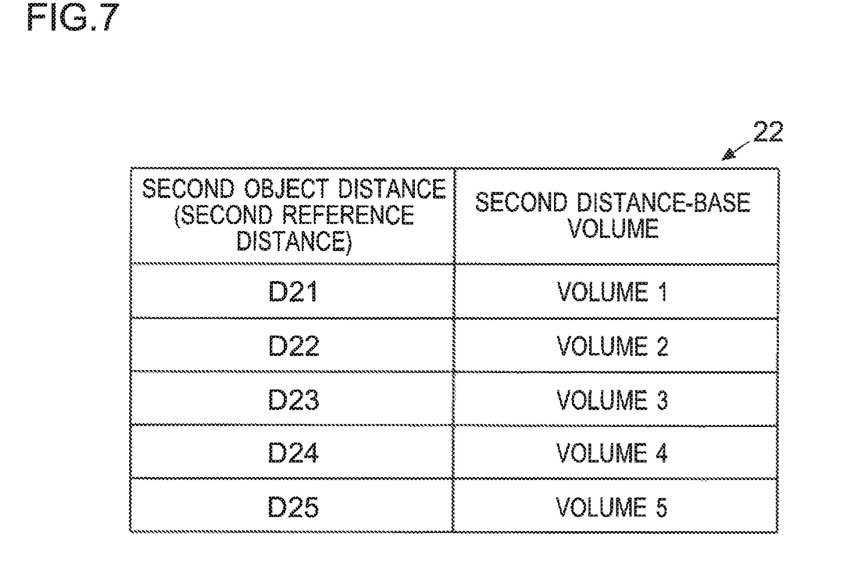
FIG. 7 is a view for explaining second predetermined information to be stored in the storage unit of the image forming apparatus according to one embodiment of the disclosure.

In the second predetermined information 22 shown in FIG. 7, D21, D22, D23, D24 and D25 are defined as the second reference distances (where it is assumed that D21<D22<D23<D24<D25). 'VOLUME 1' as a second distance-base volume is set into correspondence to the shortest second reference distance D21. 'VOLUME 2' as a second distance-base volume is set into correspondence to the second-shortest second reference distance D22. 'VOLUME 3' as a second distance-base volume is set into correspondence to the third-shortest second reference distance D23. 'VOLUME 4' as a second distance-base volume is set into correspondence to the fourth-shortest second reference distance D24. 'VOLUME 5' as a second distance-base volume is set into correspondence to the longest second reference distance D25.

Figure 8:
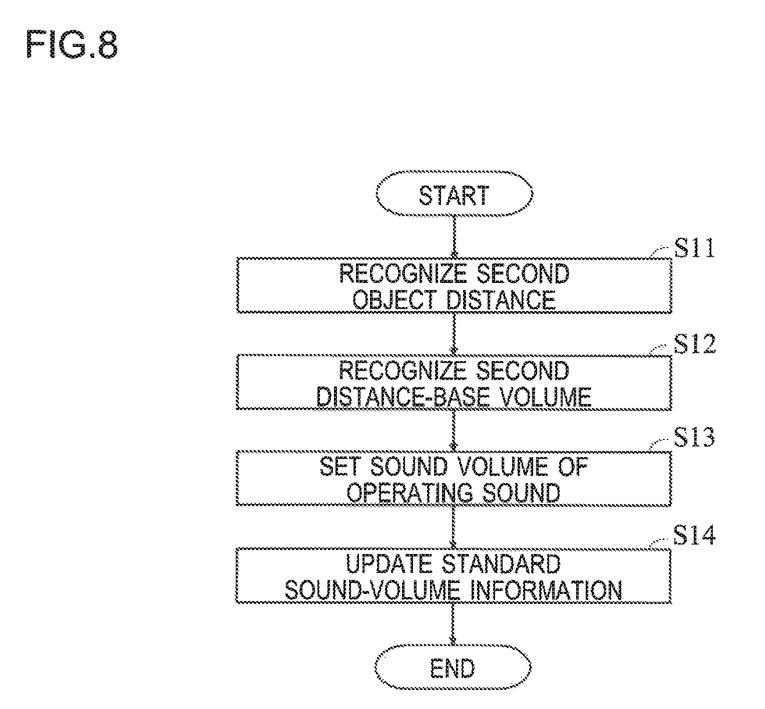
FIG. 8 is a flowchart showing a flow of a volume setting process for operating sound to be performed by the controller of the image forming apparatus according to one embodiment of the disclosure.

Hereinbelow, a volume setting process for the operating sound to be executed by the controller 10 will be described concretely with reference to a flowchart shown in FIG. 8. The flowchart of FIG. 8 gets started when the controller 10 decides that an execution timing of the update process has come up.

At step S11, the controller 10 recognizes a second object distance. At step S12, based on the second predetermined information 22, the controller 10 recognizes a second distance-base volume corresponding to the second object distance. Then, at step S13, the controller 10 sets (changes) a sound volume of the operating sound to the second distance-base volume corresponding to the second object distance.

After the change of the sound volume of the operating sound, the processing flow moves on to step S14. At step S14, the controller 10 recognizes the changed sound volume of the operating sound as an object sound volume. Then, the controller 10 updates standard sound-volume information so that a standard sound volume indicated by the standard sound-volume information becomes the object sound volume.

Assume, as an example, that the second object distance is D23. In this case, the sound volume of the operating sound is set to 'VOLUME 3.' Also, assume that the second object distance is D24. In this case, the sound volume of the operating sound is set to 'VOLUME 4.' That is, the shorter the second object distance is, the smaller the sound volume of the operating sound becomes.

Further, in a case where the second object distance is D23, the standard sound volume indicated by the standard sound-volume information is updated to 'VOLUME 3.' As a result, next time main power is thrown into the image forming apparatus 100, the sound volume of the operating sound is set to 'VOLUME 3.'

Sound volume setting for the operating sound may also be fulfilled by manual operation. A sound volume (operating-sound volume) of user's designation is accepted by the operation panel 15. When the operation panel 15 has accepted a sound volume of user's designation, the controller 10 sets (changes) the sound volume of the operating sound to the sound volume of user's designation. In this case also, the controller 10 recognizes a changed sound volume as an object sound volume, and updates the standard sound-volume information so that the standard sound volume indicated by the standard sound-volume information becomes the object sound volume.

(Sound Volume Setting Based on User's Voice)

The controller 10 executes a user recognition process of recognizing a user who is operating the operation panel 15 (hereinafter, referred to as operating user). For example, the controller 10 recognizes, as an operating user, a log-in user who is logging in to the image forming apparatus 100. In addition, the user recognition process may be fulfilled by performing a process of reading a user's fingerprint to recognize a user. Also, as the user recognition process, a process of reading a user's ID card may be performed to recognize a user.

After recognition of the operating user (while the user is logging in to the image forming apparatus 100), voice is inputted to the voice input unit 17, and input voice data corresponding to the obtained input voice are acquired. Then, the controller 10 executes a process along a flowchart shown in FIG. 9.

Figure 9:
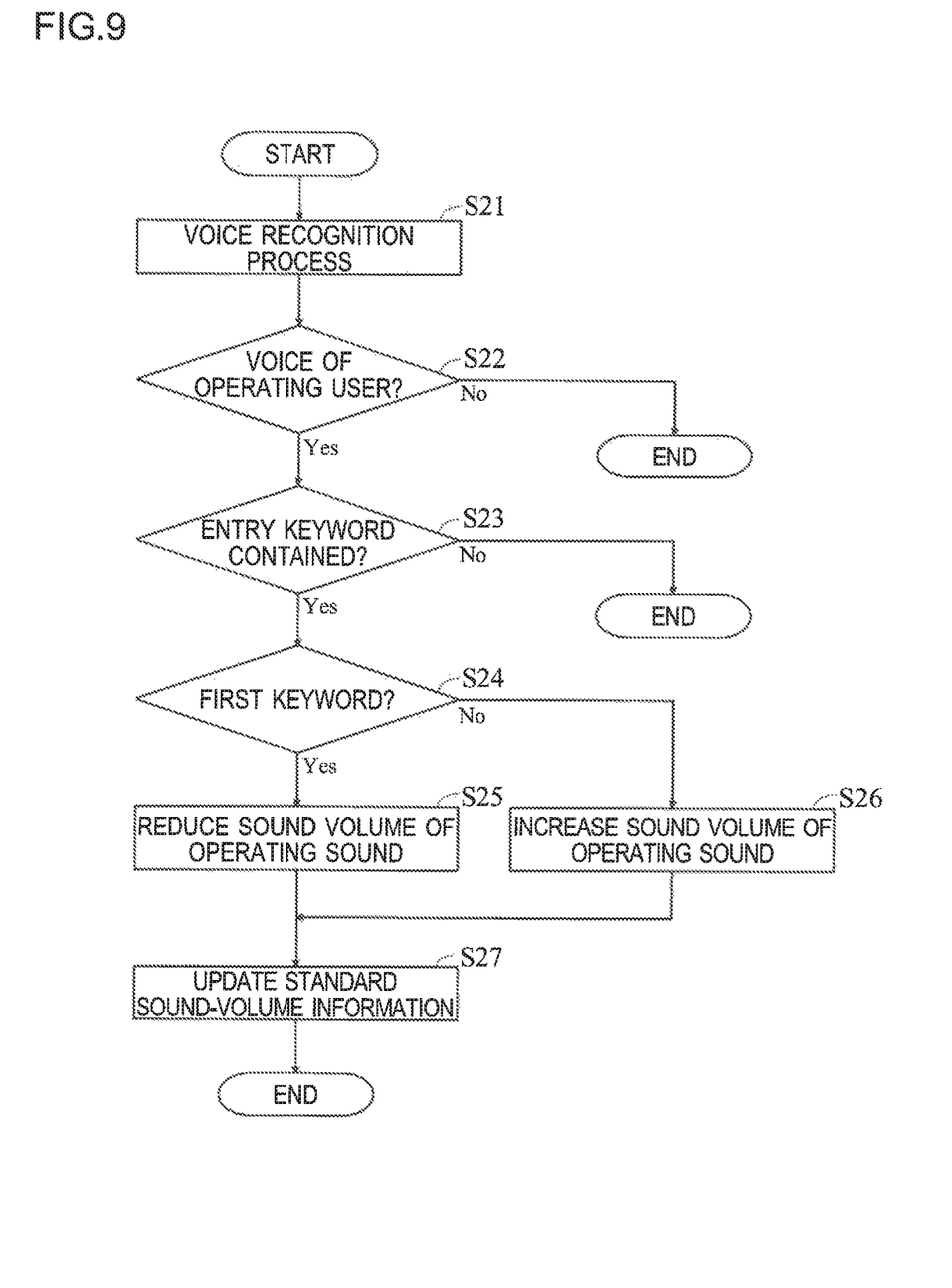
FIG. 9 is a flowchart showing a flow of a volume setting process for operating sound to be performed by the controller of the image forming apparatus according to one embodiment of the disclosure.

At step S21, the controller 10 executes a voice recognition process for the input voice data corresponding to input voice. Then, at step S22, based on a result of the voice recognition process, the controller 10 decides whether or not the input voice is a voice of the operating user. As a result, when the controller 10 decides that the input voice is a voice of the operating user, the processing flow moves on to step S23. On the other hand, when the controller 10 decides that the input voice is not voice of the operating user, the processing flow is ended (the sound volume of the operating sound is not changed).

Upon transition to step S23, the controller 10 converts the input voice data into text data. Then, the controller 10 decides whether or not previously entered keywords (hereinafter, referred to as entry keywords) are contained in the input voice data (text data). The entry keywords are stored in the storage unit 11.

In this connection, the operation panel 15 accepts an entry operation of entering keywords from the user. The controller 10 makes entry keywords, which have been accepted by the entry operation, stored (entered) in the storage unit 11.

As one process of the entry operation, the operation panel 15 accepts, from the user, a selection operation of selecting whether a keyword to be entered is a first keyword or a second keyword. In making an entry keyword stored in the storage unit 11, the controller 10 provides the entry keyword with information indicative whether the entry keyword is a first keyword or a second keyword, with a corresponding association between the entry keyword and the information.

For example, keywords implying such contents as 'loud' and 'noisy' (words to be uttered by the user with the intention of reducing the sound volume of the operating sound to smaller than a current one) are entered as first keywords. Also, keywords implying such contents as 'faint' and 'inaudible' (words to be uttered by the user with the intention of increasing the sound volume of the operating sound to larger than a current one) are entered as second keywords.

At step S23, when the controller 10 decides that an entry keyword is contained in the input voice data, the processing flow moves on to step S24. On the other hand, when the controller 10 decides that no entry keyword is contained in the input voice data, the processing flow is ended (the sound volume of the operating sound is not changed).

Upon transition to step S24, the controller 10 decides whether or not the entry keyword contained in the input voice data is a first keyword. As a result, when the controller 10 decides that the entry keyword contained in the input voice data is a first keyword, the processing flow moves on to step S25; when the controller 10 decides that the entry keyword contained in the input voice data is not a first keyword (is a second keyword), the processing flow moves on to step S26.

Upon transition from step S24 to step S25, the controller 10 reduces the sound volume of the operating sound to smaller than a current one. In this case, the controller 10 recognizes a current sound volume that is currently set as the sound volume of the operating sound. Then, the controller 10 changes the sound volume of the operating sound to one-step smaller than the current sound volume (sound volume before change). Thereafter, the processing flow moves on to step S27.

Upon transition from step S24 to step S26, the controller 10 increases the sound volume of the operating sound to larger than a current one. In this case, the controller 10 recognizes a current sound volume that is currently set as the sound volume of the operating sound. Then, the controller 10 changes the sound volume of the operating sound to one-step larger than the current sound volume (sound volume before change). Thereafter, the processing flow moves on to step S27.

Upon transition to step S27, the controller 10 recognizes, as an object sound volume, a sound volume after the change of the operating sound. Then, the controller 10 updates the standard sound-volume information so that a standard sound volume indicated by the standard sound-volume information becomes an object sound volume.

(Sharing of Standard Sound-Volume Information)

The controller 10 executes a sharing process of sharing standard sound-volume information with other image forming apparatuses 110. The controller 10 executes, as the sharing process, a process proceeding along a flowchart shown in FIG. 10. The flowchart of FIG. 10 gets started when the controller 10 has executed update of the standard sound-volume information.

Figure 10:
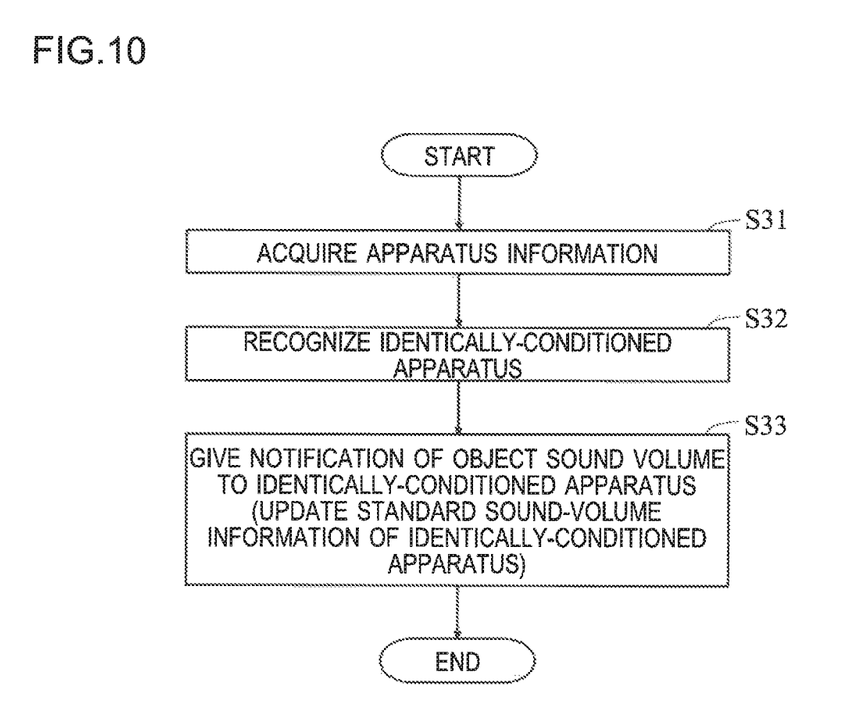
FIG. 10 is a flowchart showing a flow of a sharing process to be performed by the controller of the image forming apparatus according to one embodiment of the disclosure.

At step S31, the controller 10 communicates with other image forming apparatuses 110 by means of the communication unit 14 to acquire apparatus information as to the other image forming apparatuses 110. Then, at step S32, the controller 10 recognizes, as an identically-conditioned apparatus, another image forming apparatus 110 equal in corresponding second object distance to the image forming apparatus 100 (user's own apparatus). In addition, another image forming apparatus 110 may also be recognized as an identically-conditioned apparatus on condition that the another image forming apparatus 110 is equal in corresponding second object distance to the image forming apparatus 100 (user's own apparatus) and moreover identical to the image forming apparatus 100 (user's own apparatus) in terms of apparatus faces extending along an object provided in a room in which the image forming apparatus 100 is installed.

At step S33, the controller 10 gives a notification of an object sound volume to another image forming apparatus 110 recognized as an identically-conditioned apparatus by means of the communication unit 14, and makes the standard sound-volume information on the another image forming apparatus 110 (identically-conditioned apparatus) updated. The another image forming apparatus 110 (identically-conditioned apparatus) that has received the notification of the object sound volume changes the standard sound volume indicated by the standard sound-volume information to the object sound volume.

As described above, the image forming apparatus 100 of this embodiment includes a loudspeaker 16 for producing sounds, a controller 10 for performing setting of a sound volume of the loudspeaker 16, and a human-body detection unit 18 for detecting a pre, nce or absence of a human body. The human-body detection unit 18 outputs a value corresponding to a distance between the image forming apparatus 100 and a human body. Upon detecting a human body on a basis of an output value of the human-body detection unit 18, the controller 10 recognizes, as a first object distance, a distance corresponding to the output value of the human-body detection unit 18, and then performs volume setting for the loudspeaker 16 on the basis of the first object distance.

With the configuration of this embodiment, the controller 10 performs the volume setting for the loudspeaker 16 on the basis of the first object distance. In this connection, the first object distance varies as the user goes nearer to or farther from the image forming apparatus 100. That is, the first object distance varies depending on circumstances of the image forming apparatus 100. As a result, the sound volume of the loudspeaker 16 can automatically be set to one responsive to the circumstances of the image forming apparatus 100.

More specifically, the controller 10 sets the sound volume of the informative sound smaller and smaller as the first object distance becomes shorter and shorter (as the user becomes nearer and nearer in distance to the image forming apparatus 100). As a result of this, it can be made less likely that excessively large volume of the informative sound may cause the user to feel uncomfortable disadvantageously. With this configuration, the longer the first object distance is (the farther the user is distanced to the image forming apparatus 100), the larger the volume of the informative sound becomes. Accordingly, it is less likely that the user remains unaware of the informative sound disadvantageously.

Also in this embodiment, in terms of the sound volume setting based on the first object distance, the controller 10 prevents the sound volume of the informative sound from being set to a predetermined minimum sound volume. As a result of this, it can be made even less likely that the user remains unaware of the informative sound disadvantageously.

Also in this embodiment, the human-body detection units 18 are installed on the front face 101, the rear face 102, the left face 103 and the right face 104, respectively, of the image forming apparatus 100. As a result of this, the controller 10 is enabled to securely detect a human body while a user is present in a vicinity of the image forming apparatus 100.

Also in this embodiment, the controller 10 recognizes apparatus faces, out of the front face 101, the rear face 102, the left face 103 and the right face 104, which extend along an object present in a room in which the image forming apparatus 100 is installed. Then, the controller 10 prevents human-body detection units 18 on the recognized apparatus faces from being supplied with power supply by the power supply unit 19. As a result of this, power consumption can be reduced.

Also in this embodiment, the controller 10 decides whether a human body has been detected by a first detection unit 181 that is the human-body detection unit 18 installed on the front face 101 (face on which the loudspeaker 16 is installed) or a human body has been detected by a second detection unit 182 that is a human-body detection unit 18 other than the first detection unit 181. When a human body is detected by the first detection unit 181, the controller 10 sets the sound volume of the informative sound to a first distance-base volume corresponding to the first object distance. On the other hand, when a human body is detected by the second detection unit 182, the controller 10 sets the sound volume of the informative sound to a sound volume larger than the first distance-base volume corresponding to the first object distance. As a result of this, it can be made less likely that the user disadvantageously remains unaware of the informative sound when the sound volume of the informative sound has become smaller due to the user being present at a site which is in a vicinity of the image forming apparatus 100 and which is other than the front of the image forming apparatus 100.

Also in this embodiment, the controller 10 recognizes a second object distance corresponding to a distance between the image forming apparatus 100 and the seat closest to the image forming apparatus 100 in a room in which the image forming apparatus 100 is installed. Then, the controller 10 sets the sound volume of the operating sound smaller and smaller as the second object distance becomes shorter and shorter. As a result of this, it can be made less likely that excessively large volume of the operating sound may cause the user (a user who is assigned to a seat near the image forming apparatus 100) to feel uncomfortable disadvantageously.

Also in this embodiment, the controller 10 executes a voice recognition process for voice data corresponding to input voice inputted to the voice input unit 17, where when an entry keyword is contained in the input voice, the controller 10 changes the sound volume of the operating sound. More specifically, when a first keyword is contained in the input voice, the controller 10 reduces the sound volume of the operating sound to smaller than one before the change; on the other hand, when a second keyword is contained in the input voice, the controller 10 increases the sound volume of the operating sound to larger than one before the change. As a result, when the user feels that the sound volume of the operating sound is loud, only uttering a word implying that feeling allows the sound volume of the operating sound to be reduced; and when the user feels that the sound volume of the operating sound is faint, only uttering a word implying that feeling allows the sound volume of the operating sound to be increased, hence a convenience for the user.

Also in this embodiment, when an entry keyword is contained in input voice and moreover the input voice is a voice of an operating user, the controller 10 changes the sound volume of the operating sound; on the other hand, even when an entry keyword is contained in input voice, on condition that the input voice is not voice of an operating user, the controller 10 does not change the sound volume of the operating sound. As a result of this, it can be suppressed that the sound volume of the operating sound is unnecessarily changed.

Also in this embodiment, when main power is thrown into the image forming apparatus 100, the controller 10 sets the sound volume of the operating sound to a standard sound volume indicated by standard sound-volume information. Thereafter, when the sound volume of the operating sound is changed, the controller 10 recognizes the changed sound volume (sound volume desired by the user) as an object sound volume, and moreover updates the standard sound-volume information so that a standard sound volume indicated by the standard sound-volume information becomes an object sound volume. As a result of this, next time main power is thrown into the image forming apparatus 100, the sound volume of the operating sound can be set to a sound volume desired by the user.

Also in this embodiment, when the standard sound-volume information is updated, the controller 10 gives a notification of an object sound volume to an identically-conditioned apparatus that is another image forming apparatus 110 equal in second object distance to the image forming apparatus 100, so that the standard sound volume indicated by the standard sound-volume information of the another image forming apparatus 110 (identically-conditioned apparatus) which has been given the notification of the object sound volume is changed to the object sound volume. As a result of this, the sound volume of the operating sound of the another image forming apparatus 110 (identically-conditioned apparatus) can be set to a proper one.

The embodiment disclosed herein should be construed as not being limitative but being an exemplification at all points. The scope of the disclosure is defined not by the above description of the embodiment but by the appended claims, including all changes and modifications equivalent in sense and range to the claims.

What is claimed is:

1. An image forming apparatus comprising:
a loudspeaker for producing sounds;
a controller for performing sound-volume setting for the loudspeaker; and
a human-body detection unit for detecting a presence or absence of a human body, wherein
the human-body detection unit outputs a value corresponding to a distance between the image forming apparatus and a human body,
upon detecting a human body on a basis of an output value by the human-body detection unit, the controller recognizes, as a first object distance, a distance corresponding to the output value of the human-body detection unit, and performs sound-volume setting for the loudspeaker on a basis of the first object distance,
the sounds produced by the loudspeaker include an informative sound for giving information to a user of the image forming apparatus,
the controller makes sound volume of the informative sound smaller and smaller as the first object distance becomes shorter and shorter
the human-body detection unit is installed on each of a front face, a rear face, a left face and a right face of the image forming apparatus; and
a power supply unit for supplying electric power to the plural human-body detection units, wherein
the controller recognizes one or more apparatus faces, out of the front face, the rear face, the left face and the right face, extending along an object present in a room in which the image forming apparatus is installed, and the controller prevents the human-body detection units installed on the apparatus faces extending along the object from being supplied with electric power by the power supply unit.

2. The image forming apparatus according to claim 1, wherein
in the sound-volume setting based on the first object distance, the controller prevents the sound volume of the informative sound from being lowered to a predetermined minimum volume.

3. An image forming apparatus comprising:
a loudspeaker for producing sounds, the sounds including an informative sound for giving information to a user of the image forming apparatus;
a controller for performing sound-volume setting for the loudspeaker; and
a human-body detection unit for detecting a presence or absence of a human body, wherein
the human-body detection unit outputs a value corresponding to a distance between the image forming apparatus and a human body,
upon detecting a human body on a basis of an output value by the human-body detection unit, the controller recognizes, as a first object distance, a distance corresponding to the output value of the human-body detection unit, and performs sound-volume setting for the loudspeaker on a basis of the first object distance the controller makes sound volume of the informative sound smaller and smaller as the first object distance becomes shorter and shorter, and the human-body detection unit is installed on each of a front face, a rear face, a left face and a right face of the image forming apparatus;

the image forming apparatus further comprising:

a storage unit for storing a sound volume correspondingly associated with the first object distance, wherein the loudspeaker is installed on a specified apparatus face out of the front face, the rear face, the left face and the right face, and the controller decides whether a human body has been detected by a first detection unit that is the human-body detection unit installed on the specified apparatus face or a human body has been detected by a second detection unit that is another one of the human-body detection unit, where when a human body has been detected by the first detection unit, the controller sets sound volume of the informative sound to a sound volume corresponding to the first object distance, and when a human body has been detected by the second detection unit, the controller sets the sound volume of the informative sound to one larger than a sound volume corresponding to the first object distance.

4. An image forming apparatus comprising:

a loudspeaker for producing sounds;

a controller for performing sound-volume setting for the loudspeaker;

an operation panel for accepting operations, and a human-body detection unit for detecting a presence or absence of a human body, wherein the human-body detection unit outputs a value corresponding to a distance between the image forming apparatus and a human body, and upon detecting a human body on a basis of an output value by the human-body detection unit, the controller recognizes, as a first object distance, a distance corresponding to the output value of the human-body detection unit, and performs sound-volume setting for the loudspeaker on a basis of the first object distance;

wherein the sounds produced by the loudspeaker include an operating sound of the operation panel, and the controller recognizes a second object distance corresponding to a distance between the image forming apparatus and a seat closest to the image forming apparatus in a room in which the image forming apparatus is installed, and the controller sets sound volume of the operating sound smaller and smaller as the second object distance becomes shorter and shorter.

5. The image forming apparatus according to claim 4, further comprising:

a storage unit for storing previously entered keywords; and a voice input unit for converting inputted input voice into voice data, wherein the controller executes a voice recognition process for the voice data, where when any one of the keywords is contained in the input voice, the controller changes the sound volume of the operating sound.

6. The image forming apparatus according to claim 5, wherein the keywords include a first keyword and a second keyword, and when the first keyword is contained in the input voice, the controller sets the sound volume of the operating sound smaller than one before change, and when the second keyword is contained in the input voice, the controller sets the sound volume of the operating sound larger than one before change.

7. The image forming apparatus according to claim 5, wherein when any one of the keywords is contained in the input voice and moreover the input voice is a voice of an operating user that is currently operating the operation panel, the controller changes the sound volume of the operating sound, and on the other hand, even when any one of the keywords is contained in the input voice, on condition that the input voice is other than a voice of the operating user, the controller prevents the sound volume of the operating sound from being changed.

8. The image forming apparatus according to claim 4, further comprising a storage unit for storing standard sound-volume information indicative of a standard sound volume of the operating sound, wherein when main power is thrown into the image forming apparatus, the controller sets sound volume of the operating sound to the standard sound volume indicated by the standard sound-volume information, and when having changed the sound volume of the operating sound, the controller recognizes a sound volume after the change as an object sound volume and moreover updates the standard sound-volume information so that the standard sound volume indicated by the standard sound-volume information becomes the object sound volume.

9. The image forming apparatus according to claim 8, further comprising a communication unit for communicating with other image forming apparatuses, wherein when having updated the standard sound-volume information, the controller gives a notification of the object sound volume to an identically-conditioned apparatus that is one of the other image forming apparatuses equal in the second object distance to the image forming apparatus, and the controller changes the standard sound volume indicated by the standard sound-volume information of the identically-conditioned apparatus to the object sound volume.

* * * * *